US009813708B2

(12) United States Patent
Lin et al.

(10) Patent No.: US 9,813,708 B2
(45) Date of Patent: Nov. 7, 2017

(54) METHOD AND SYSTEM OF CODING PREDICTION FOR SCREEN VIDEO

(71) Applicant: INDUSTRIAL TECHNOLOGY RESEARCH INSTITUTE, Hsinchu (TW)

(72) Inventors: Chun-Lung Lin, Yunlin County (TW); Pei-Hsuan Tsai, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 626 days.

(21) Appl. No.: 14/255,261

(22) Filed: Apr. 17, 2014

(65) Prior Publication Data
US 2015/0163485 A1 Jun. 11, 2015

(30) Foreign Application Priority Data
Dec. 5, 2013 (TW) .............................. 102144619 A (51) Int. Cl.
*H04N 19/583* (2014.01)
*H04N 19/105* (2014.01)
(Continued)

(52) U.S. Cl.
CPC ......... *H04N 19/105* (2014.11); *H04N 19/117* (2014.11); *H04N 19/14* (2014.11);
(Continued)

(58) Field of Classification Search
CPC .... H04N 19/105; H04N 19/117; H04N 19/14; H04N 19/176; H04N 19/52; H04N 19/56; H04N 19/567
(Continued)

(56) References Cited

U.S. PATENT DOCUMENTS 5,737,537 A  4/1998  Gardos et al.
6,275,614 B1 8/2001  Krishnamurthy et al.
(Continued)

FOREIGN PATENT DOCUMENTS

CN  1279752 C  10/2006
CN  101945275 B 10/2012
(Continued)

OTHER PUBLICATIONS

Lin et al "Compound Image Compression for Real-Time Computer Screen Image Transmission" "" IEEE Transactions on Image Processing, vol. 14, No. 8, Aug. 2005, p. 993-1005.*
(Continued)

*Primary Examiner* — William C Vaughn, Jr.
*Assistant Examiner* — Naod Belai
(74) *Attorney, Agent, or Firm* — JCIPRNET (57) ABSTRACT

According to one to one exemplary embodiment, the disclosure provides a method of coding prediction for screen video. The method classifies a plurality of coding blocks into a plurality of block types by using a classifier; and uses a computing device to filter at least one candidate block from the plurality of coding blocks, according to the plurality of block types of the plurality of coding blocks, and compute a first candidate motion vector set of a type-based motion merge mode and a second candidate motion vector set of a type-based advanced motion vector prediction mode, wherein each of the at least one candidate block has a block-type different from that of a current coding block.

17 Claims, 10 Drawing Sheets

(51) Int. Cl.
*H04N 19/56* (2014.01)
*H04N 19/52* (2014.01)
*H04N 19/176* (2014.01)
*H04N 19/117* (2014.01)
*H04N 19/14* (2014.01)
*H04N 19/567* (2014.01)

(52) U.S. Cl.
CPC ........... *H04N 19/176* (2014.11); *H04N 19/52* (2014.11); *H04N 19/56* (2014.11); *H04N 19/567* (2014.11)

(58) Field of Classification Search
USPC .................................................... 375/240.16
See application file for complete search history.

(56) References Cited

U.S. PATENT DOCUMENTS

| | | | |
|---|---|---|---|
| 7,072,512 B2 | 7/2006 | Mehrotra | |
| 7,340,103 B2 | 3/2008 | Smirnov | |
| 2008/0232642 A1* | 9/2008 | Chang | H04N 5/145 382/103 |
| 2011/0090964 A1 | 4/2011 | Xu et al. | |
| 2012/0320969 A1* | 12/2012 | Zheng | H04N 19/40 375/240.02 |
| 2013/0156335 A1* | 6/2013 | Lim | H04N 19/52 382/238 |
| 2013/0195189 A1* | 8/2013 | Seregin | H04N 19/00587 375/240.16 |
| 2013/0243093 A1* | 9/2013 | Chen | H04N 19/00733 375/240.16 |
| 2014/0098879 A1* | 4/2014 | Kim | H04N 19/553 375/240.16 |
| 2015/0063451 A1* | 3/2015 | Zhu | H04W 4/18 375/240.09 |

FOREIGN PATENT DOCUMENTS

| | | |
|---|---|---|
| EP | 1480463 A2 | 11/2004 |
| WO | WO-2013102380 A1 | 7/2013 |

OTHER PUBLICATIONS

Wei et al., "Low Complexity Mode Decision for H.264 Based on Macroblock Motion Classification", in Proc. 2nd Int'l Symp. on Information Science and Engineering, 2009.

Yusuf et al.,"A Novel Rate-Based Macroblock Classification for Fast Mode Decision in H.264 Video Coding", in Proc.14th Int'l Conf.on Computer and Information Technology (ICCIT 2011), pp. 22-24, Dec. 2011.

Zhang et al., "Motion information based adaptive block classification for fast motion estimation," in Proc. Int'l Conf. Neural Networks and Signal Processing, pp. 686-691, Jun. 2008.

Yang et al., "Fast macroblock mode selection based on motion content classification in H.264/AVC," in Proc. Int'l Conf. Image ProcessingICIP '04, pp. 741-744 vol. 2, Oct. 2004.

Li et al., "Fast and Efficient Method for Block Edge Classification and Its Application in H.264/AVC Video Coding," IEEE Trans. on Circuits and Systems for Video Technology, vol. 18, No. 6, pp. 756-768, Jun. 2008.

Shen et al., "Classification-Based Adaptive Compression Method for Computer Screen Image", in Proc. ICME Workshops, 2012, pp. 7-12.

Gonzalez-Diaz et al., Adaptive Multipattern Fast Block-Matching Algorithm Based on Motion Classification Techniques, IEEE Trans. on Circuits and Systems for Video Technology, 2008, p. 1369-p. 1382.

Asefi et al., Adaptive Video Motion Estimation Algorithm via Estimation of Motion Length Distributionand Bayesian Classification, IEEE International Symposium on Signal Processing and Information Technology, 2006 p. 807-p. 810.

Chang et al., An adaptive search algorithm based on block classification for fast block motion estimation, IEEE International Symposium on Circuits and Systems, 2006, p. 3982-p. 3985.

Wang et al., An improved motion-search method based on pattern classification, IEEE International Conference on Acoustics Speech and Signal Processing, 2010, p. 2134-p. 2137.

Ding, Class-Based Search Algorithm for Inter Mode Prediction of H.264/AVC, International Conference on Systems, Signals and Image Processing, 2009, p. 1-p. 4.

Linet al., Compound image compression for real-time computer screen image transmission, IEEE Transactions on Image Processing, 2005, p. 993-p. 1005.

Sullivan et al, "Overview of the High Efficiency Video Coding (HEVC) Standard," Circuits and Systems for Video Technology, IEEE Transactions on , vol. 22, No. 12, pp. 1649, 1668, Dec. 2012.

Choi et al., "Early TU decision method for fast video encoding in high efficiency video coding," Electronics Letters, vol. 48, No. 12, pp. 689-691, Jun. 2012.

Ding et al., "YUV444 test sequences for screen content,"JCTVC-M0431, Incheon, KR, Apr. 2013.

* cited by examiner

METHOD AND SYSTEM OF CODING PREDICTION FOR SCREEN VIDEO

CROSS-REFERENCE TO RELATED APPLICATION TECHNICAL FIELD

The present application is based on, and claims priority from, Taiwan Patent Application No. 102144619, filed Dec. 5, 2013, the disclosure of which is hereby incorporated by reference herein in its entirety.

TECHNICAL FIELD

The technical field generally relates to a method and system of coding prediction for screen video.

BACKGROUND

Screen content coding (SCC) is a key technology that is often applied to services, such as smart home, cloud game, medical service, and so on. The SCC technology is to capture the screen frames from all kinds of devices and to perform compression and encoding on the captured video contents having a plurality of consecutive frames. The wireless multi-screen products for sharing screen contents, such as Media Link HD, All Share Cast, etc., also define communication standard protocols for mirroring services, such as Miracast standard of Wi-Fi Display, Peer-to-Peer (P2P) wireless screen cast, to provide standard for cross-platform content sharing. Cloud interactive screen sharing service platform shares the screen frame executed on remote server to users through Internet so that users may control the remote server via the interactive interface for applications, such as cloud game, cloud smart home, remote desktop, and so on.

In the process of video coding, the inter-prediction and the intra-prediction between frames play important roles. The inter-prediction performs compression and coding based on the temporal relevance of the screen contents at different time points of the video, and the intra-prediction performs compression and coding based on the spatial relevance of the screen contents between neighboring areas in a frame. SCC often uses statistic parameters to determine whether each block of the input image is a blank block, a non-moving block or a moving block, and then selects a corresponding skip mode, intra-coding or inter-coding. Another embodiment of SCC is to classify an input image into a pre-defined class according to the characteristics of the input image, such as scene statistics, and then assigns different weight and adopts different coding parameters for each image of different class.

The contents of a screen video often include such as text, lines and graphics, which are different from usual video contents. The contents of text, lines, and graphics and the like are non-natural image and high-frequency data, and are prone to blurring or disappearance. Various coding techniques are proposed targeting screen video contents, and some coding methods are adopted by video coding standards, such as H.265/High Efficiency Video Coding (HEVC).

HEVC includes a plurality of coding modes, and motion merge mode is one of the coding modes. The motion merge mode selects at most five from the motion vectors of seven locations, either temporal (different images) or spatial (neighboring area of the same image), as candidates. The seven vectors include five motion vectors of the neighboring images and two motion vectors of a reference image. For example, for the seven coding blocks to select from, up to four may be selected from a plurality of coding blocks of the neighboring area of the same image, and up to one may be selected from the coding blocks corresponding to the same location in different images. Because some locations may not have a motion vector, at most five motion vectors are selected according to a specific order and then the motion vector with best match among the five motion vectors will be selected as the coding result. The area pointed by the motion vector is similar to the current area to be coded. As such, the compression effect is achieved by the means similar to motion compensations.

Advanced motion vector prediction (AMVP) mode is another coding mode of the plurality of coding modes in HEVC. AMVP mode compares against the five motion vectors of the neighboring image and two motion vectors of the reference image, and selects a search initial point for motion vectors. In other words, two out of seven motion vectors (the same as motion merge mode) are selected as candidates, and the motion vector with best match by comparison is selected as the coding result.

The aforementioned coding techniques or products of screen video contents use the characteristics of screen video contents and designs specific intra-coding targeting the images on the intra-prediction of text, natural graphics, mixed images of natural graphics and text. For example, HEVC SCC targets the contents of screen video on the intra-prediction of text, natural graphics, mixed images of natural graphics and text to adapt high coding complexity (such as, multiple of H.264) hardware and high memory access (such as, multiple of double data rate (DDR) memory bandwidth) to perform coding.

SUMMARY

The exemplary embodiments of the disclosure provide a method and system of coding prediction for screen video.

An exemplary embodiment relates to a method of coding prediction for screen video. The method may comprise: classifying, by using a classifier, a plurality of coding blocks of a screen video contents into a plurality of block types; and based on the plurality of block types corresponding to the plurality of coding blocks, using a computing device to filter at least a candidate block from the plurality of coding blocks, and to compute a first candidate motion vector set of a type-based motion merge (TMM) mode, and a second candidate motion vector set of a type-based advanced motion vector prediction (AMVP) mode, wherein each of the at least a candidate block has a block type different from that of a current coding block.

Another embodiment relates to a system of coding prediction for screen video. The system may comprise a classifier and a computing device. The classifier classifies a plurality of coding blocks of a screen video contents into a plurality of block types. The computing device, based on the plurality of block types corresponding to the plurality of coding blocks, filters at least a candidate block from the plurality of coding blocks, and computes a first candidate motion vector set of a type-based motion merge (TMM) mode, and a second candidate motion vector set of a type-based advanced motion vector prediction (AMVP) mode, wherein each of the at least a candidate block has a block type different from that of a current coding block.

The foregoing will become better understood from a careful reading of a detailed description provided herein below with appropriate reference to the accompanying drawings.

DETAILED DESCRIPTION OF THE DISCLOSED EMBODIMENTS

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to the exemplary embodiments, the disclosure may provide an embodiment of coding prediction for screen video. The embodiment uses the difference between the common video contents and the screen video contents containing text, lines and graphics, and uses the block types of the coding blocks to improve the inter/intra prediction efficiency of screen video coding. According to the embodiments of the disclosure, the smallest unit of inter-prediction and intra-prediction is called a coding block. A plurality of coding blocks of a screen video is first classified into a plurality of block types, such as text image and natural image. For each of the plurality of coding blocks, at least a candidate block having a block type different from a current coding block is filtered according to the block types of the coding blocks of the plurality of coding blocks, to construct a first candidate motion vector set of a motion merge mode and a second candidate motion vector set of AMVP mode. According to the block type of the current coding block, the embodiment also filters search points having different block type from that of the current coding block to rapidly find an estimated motion vector.

Figure 1:
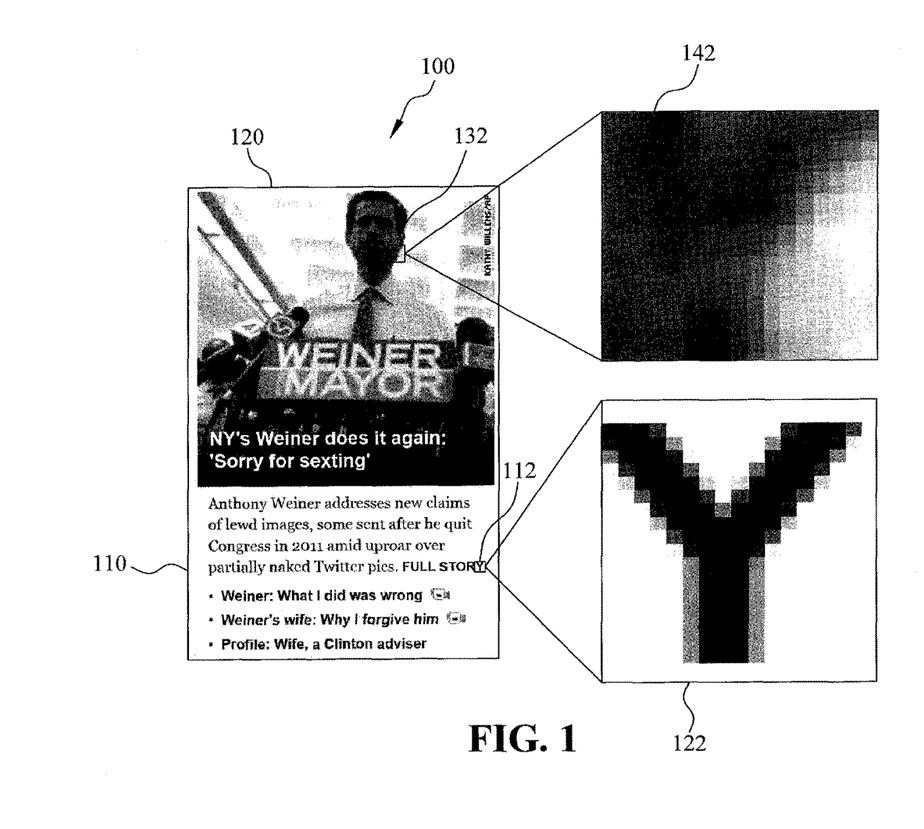
FIG. 1 shows an exemplary schematic view of text image contents and natural image contents in a screen video contents, in accordance with an exemplary embodiment.

Accordingly, the plurality of coding blocks in a screen video may be classified into two block types. One is the non-natural image type and the other is the natural image type. For example, each of the plurality of coding blocks is a text image or a natural image. FIG. 1 shows an exemplary schematic view of text image contents and natural image contents in a screen video contents, in accordance with an exemplary embodiment. In the exemplar in FIG. 1, the screen video contents 100 may include two parts, wherein one part is the text image content part 110 and the other part is the natural image content part 120. A block 112 of the text image content part 110 after enlarged is a text image content 122. A block 132 of the natural image content part 120 after enlarged is a natural image content 142. In other words, the screen video contents may include a non-natural image content part and a natural image content part, or one of the aforementioned two parts. The non-natural image content part is the non-natural image content of one of the types of text, line or graphics, or any combination of the above types. The types of the non-natural image content are not limited to the above text, line or graphics.

Figure 2:
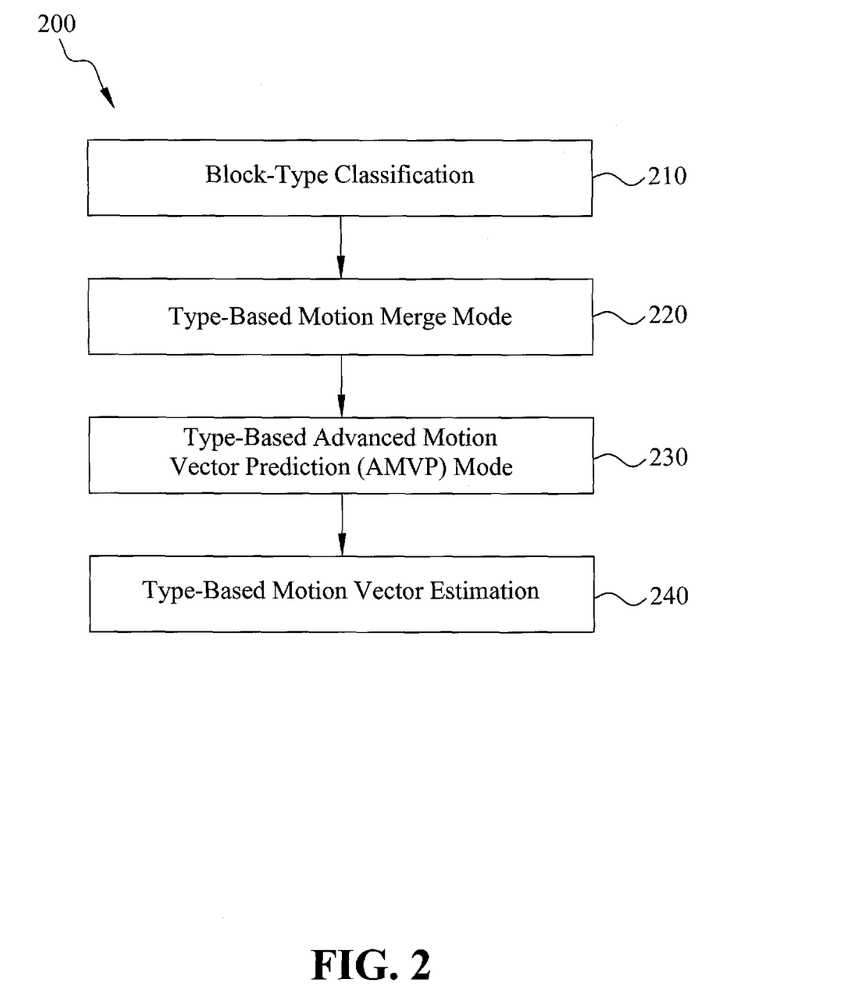
FIG. 2 shows components of prediction coding of screen video by using block classification, in accordance with an exemplary embodiment.

FIG. 2 shows components of prediction coding of a screen video by using block classification, in accordance with an exemplary embodiment. Referring to FIG. 2, the components 200 of prediction coding of the screen video by using block classification may comprise four parts, i.e., a block-type classification 210, a type-based motion merge mode 220, a type-based advanced motion vector prediction (AMVP) mode 230, and a type-based motion vector estimation 240.

Figure 3:
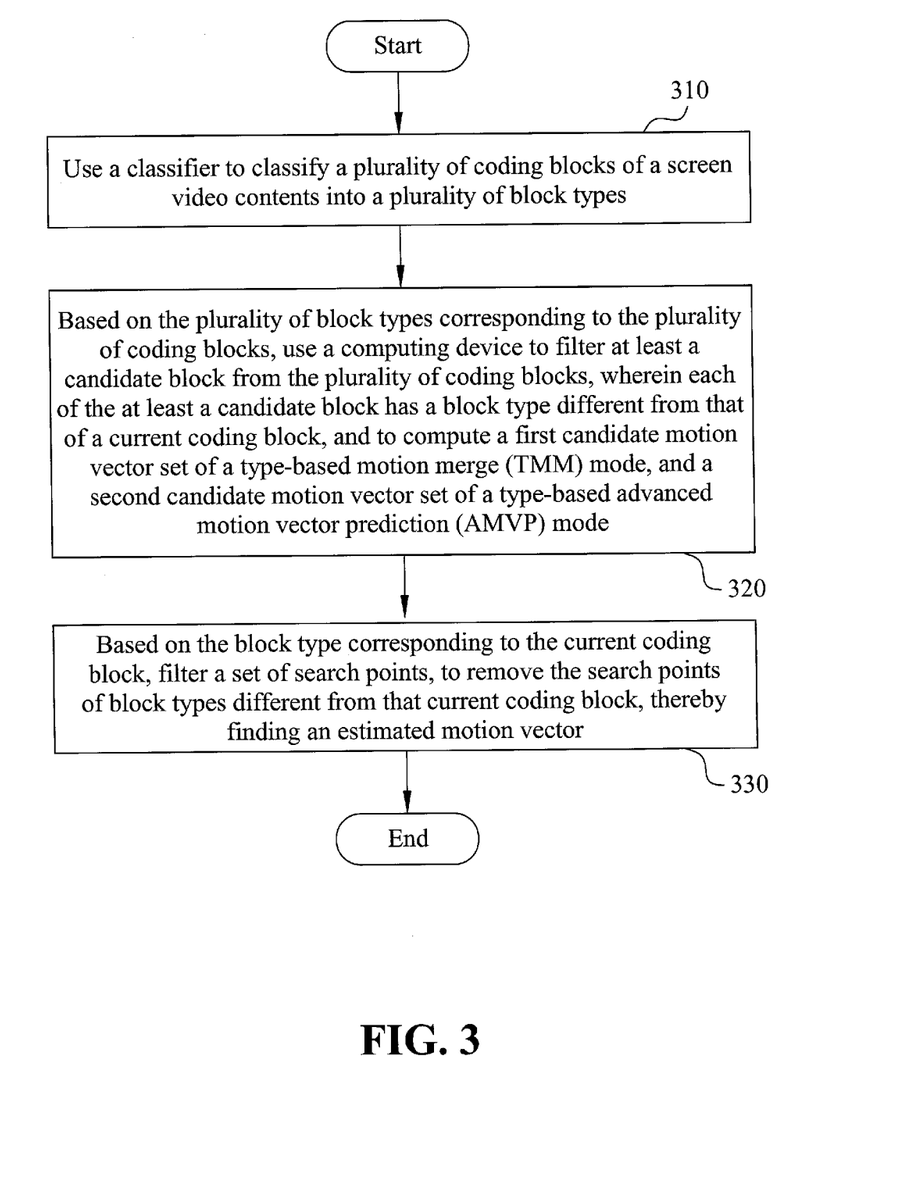
FIG. 3 shows a method of coding prediction for screen video, in accordance with an exemplary embodiment.

FIG. 3 shows a method of coding prediction for screen video, in accordance with an exemplary embodiment. Referring to FIG. 3, the method uses a classifier to classify a plurality of coding blocks of a screen video contents into a plurality of block types (step 310); and based on the plurality of block types corresponding to the plurality of coding blocks, uses a computing device to filter at least a candidate block from the plurality of coding blocks, wherein each of the at least a candidate block has a block type different from that of a current coding block, and to compute a first candidate motion vector set of a type-based motion merge (TMM) mode, and a second candidate motion vector set of a type-based advanced motion vector prediction (AMVP) mode (step 320). Based on the block type corresponding to the current coding block, the method may further filter a set of search points, to remove the search points of block types different from that of the current coding block, thereby finding an estimated motion vector (step 330). The search of motion vector(s) will be described in FIG. 10B.

Figure 4:
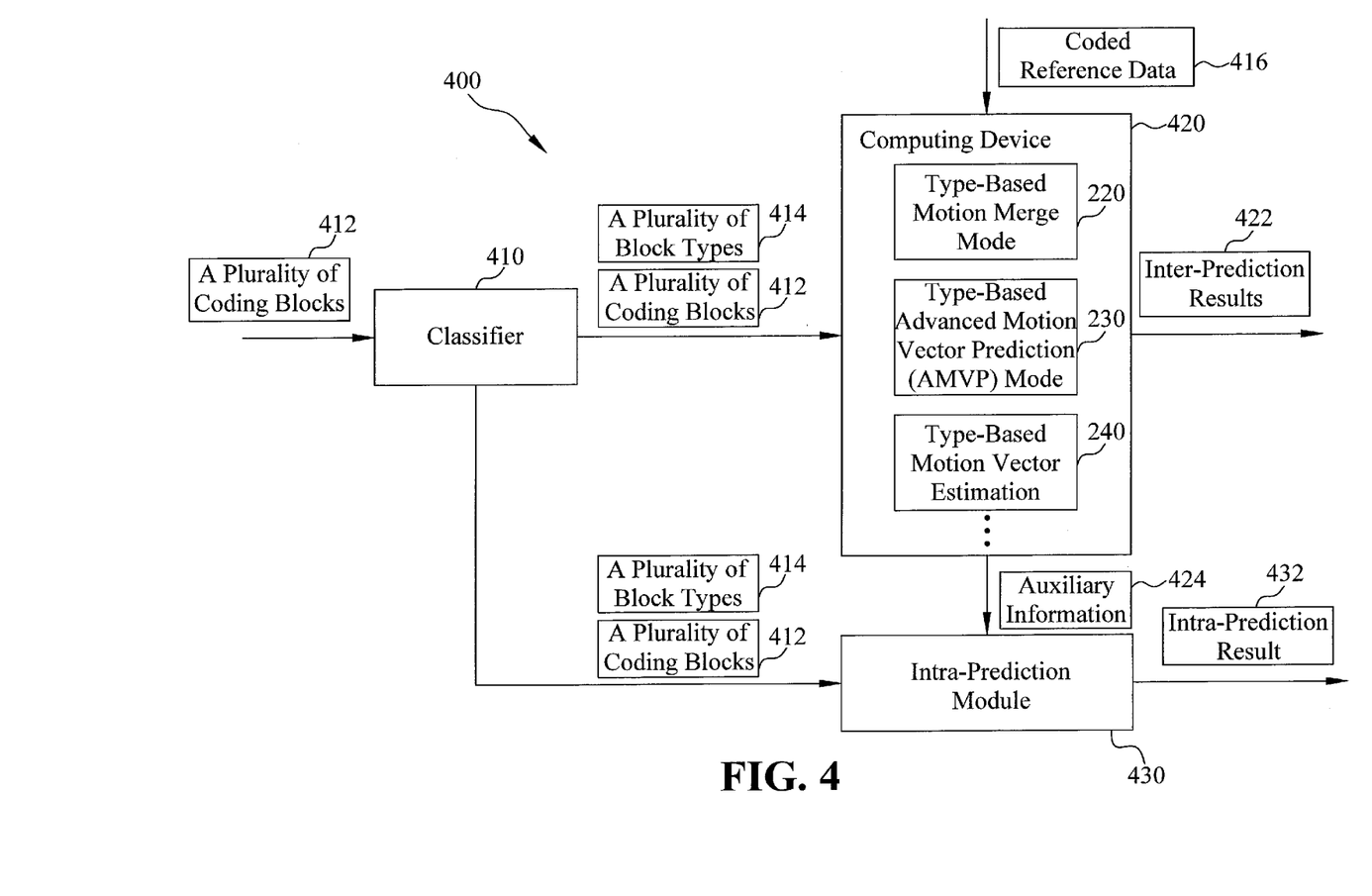
FIG. 4 shows a system of coding prediction for screen video, in accordance with an exemplary embodiment.

Accordingly, FIG. 4 shows a system of coding prediction for screen video, in accordance with an exemplary embodiment. Referring to FIG. 4, the system 400 of coding prediction for screen video may comprise a classifier 410 and a computing device 420. The classifier 410 classifies a plurality of coding blocks 412 of a screen video contents into a plurality of block types 414, and provides the plurality of coding blocks 412 and the plurality of block types 414 to the computing device 420. The computing device 420, based on the plurality of block types 414 corresponding to the plurality of coding blocks 412, performs an inter-prediction process. The inter-prediction process includes filtering at least a candidate block from the plurality of coding blocks 412, wherein each of the at least a candidate block has a block type different from that of a current coding block, and computing a first candidate motion vector set of a type-based motion merge (TMM) mode 220, and a second candidate motion vector set of a type-based advanced motion vector prediction (AMVP) mode 230. Based on the plurality of coding blocks 414 and coded reference data 416, the computing device 420 may further filter a set of search points to remove the search points of block types different from that of the current coding block to rapidly find an estimated motion vector (i.e., type-based motion vector estimation 240). The plurality of coding blocks 412 may be formed by dividing an input screen image.

Accordingly, after executing the inter-prediction process, the computing device 420 outputs inter-prediction results 422, such as but not limited to, the first candidate motion vector set of a type-based motion merge (TMM) mode 220, the second candidate motion vector set of a type-based advanced motion vector prediction (AMVP) mode 230, the found estimated motion vector, and so on. The coded reference data 416 may be, such as but not limited to, one of or any combination of the aforementioned reference data, including coded reference block pixels, coded reference block motion vectors, coded reference block types, and so on. The reference block is a block in a reference screen image for searching motion vector. As shown in FIG. 4, the computing device 420 may further provide auxiliary information 424. Whether to provide auxiliary information 424 depends on users' demand. When the auxiliary information 424 is provided, the information may be used to assist the operation of an intra-prediction module 430. For example, the intra-prediction module 430 may wait for the result of type-based motion vector estimation 240. If the type-based motion vector estimation 240 already obtains a good result, during the SCC process, the auxiliary information 424 and the plurality of block types provided by the block type classifier 410 may be used to perform the intra-prediction module 430 to generate an intra-prediction result 432.

According to the exemplary embodiments of the present disclosure, the basic theory of designing the classifier is as follows. The non-natural image content part usually includes a small amount of base colors and higher frequency signals. Because the count of base colors may be obtained by a simple calculation, and the natural image content part may be efficiently filtered using the base colors. Therefore, according to an exemplary embodiment, a threshold (called color count threshold C1) may be set for the base color count. When the count of the base colors in a coding block is larger than the threshold C1, the coding block is classified as a block of natural image content; when the count of the base colors in a coding block is less than the threshold C1, the frequency information of the coding block and a plurality of frequency count thresholds are used to further select a plurality of block types. According to the embodiment, a plurality of frequency count thresholds may be set, and the type of a coding block may be determined by determining which frequency count threshold is closest to the high frequency count of the coding block.

Figure 5:
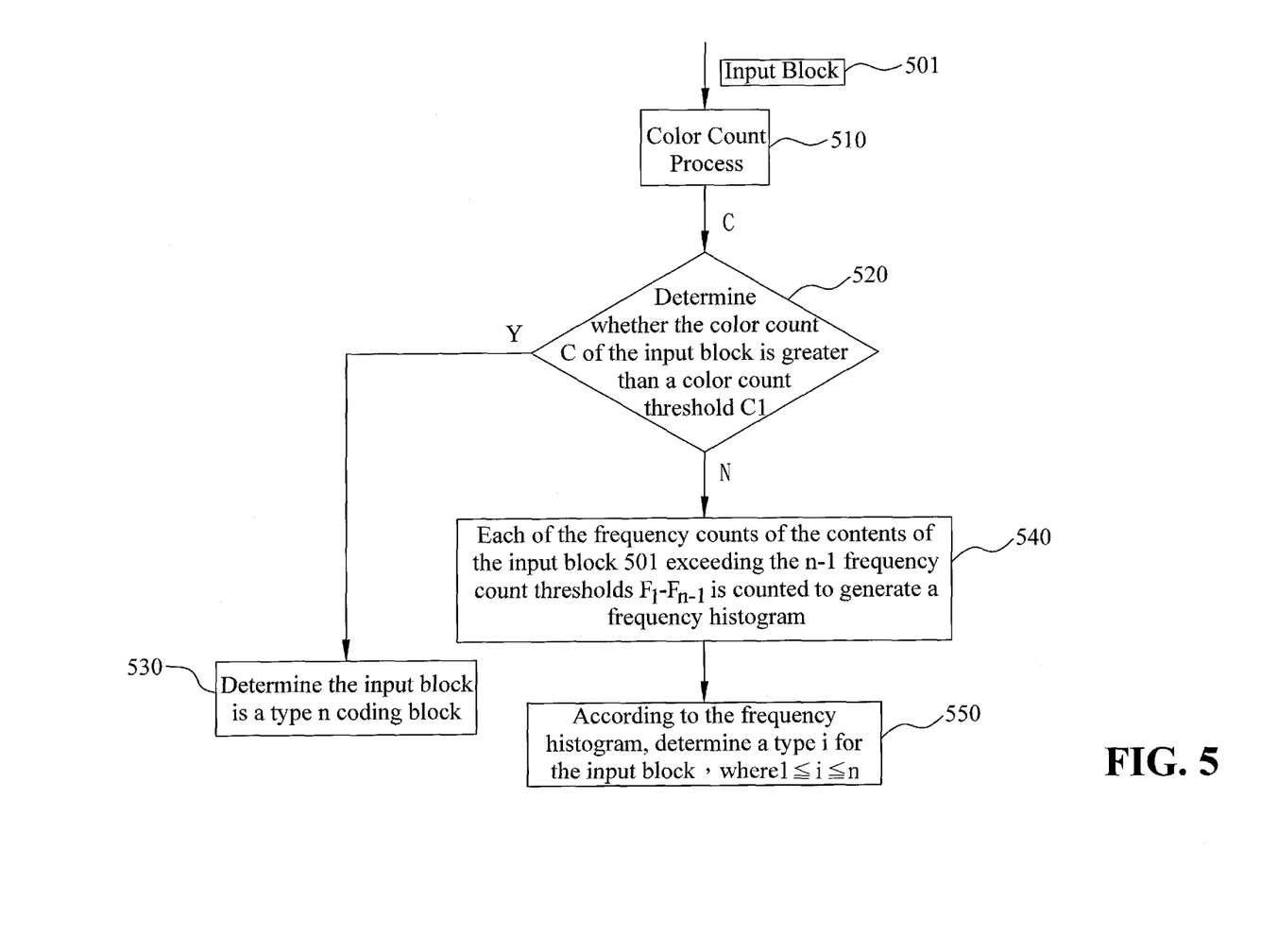
FIG. 5 shows an operation flow of a classifier, in accordance with an exemplary embodiment.

FIG. 5 shows an operation flow of a classifier, in accordance with an exemplary embodiment, wherein the classifier is an n-type classifier, and n is an integer greater than or equal to 2. In the exemplar of FIG. 5, a block type is classified based on the color count corresponding to the block. The n-type classifier uses a color count process (step 510) to compute a color count C of an input block 501, and determines whether the color count C of the input block 501 is greater than a color count threshold C1 (step 520). When the color count C of the input block 501 is greater than the color count threshold C1, the n-type classifier determines the input block 501 is a type n coding block (step 530). When the color count C of the input block 501 is less than or equal to the color count threshold C1, each of the frequency counts of the contents of the input block 501 exceeding the n−1 frequency count thresholds $F_1$-$F_{n-1}$ is counted to generate a frequency histogram (step 540). For example, if the count of the first frequency of the contents of the input image exceeds $F_1$, the frequency count of the first frequency is incremented by 1; if the count of the second frequency of the contents of the input image exceeds $F_2$, the frequency count of the second frequency is incremented by 1; and so on. If the count of the (n−1)th frequency of the contents of the input image exceeds $F_{n-1}$, the frequency count of the (n−1)th frequency is incremented by 1. According to the frequency histogram, the n-type classifier may determine a type i for the input block, where $1 \le i \le n$ (step 550).

For instance, take a 2-type classifier as an example. When a count of base colors in a coding block is greater than or equal to the color count threshold C1, the coding block is classified as a block of natural image contents. When a count of base colors in a coding block is less than the color count threshold C1, the frequency information is further used to filter the blocks of natural image contents. Because the histogram of the alternate coefficient (AC) components (high frequencies) of the blocks of natural image contents is often more uniformly distributed and the histogram of the AC components (high frequency) of the blocks of non-natural image contents is often more concentrated, this characteristic is used to set a frequency count threshold $F_1$, the count of AC components exceeding the frequency count threshold $F_1$ is counted, and the block is determined as a block of natural image contents (such as, picture block) when the count of AC components is less than the frequency count threshold $F_1$; otherwise, the block is determined as a block of non-natural image contents (such as, text block).

Accordingly, the classifier 410 outputs each coding block and related classification result to the computing device 420 so that the computing device 420 may use the classification result to improve coding efficiency and speed in SCC when performing the inter-prediction process. The classifier 410 may also output each coding block and related classification results to the intra-prediction module 430, and the intra-prediction module 430 may use the classification results to improve coding efficiency and speed in SCC.

Figure 6:
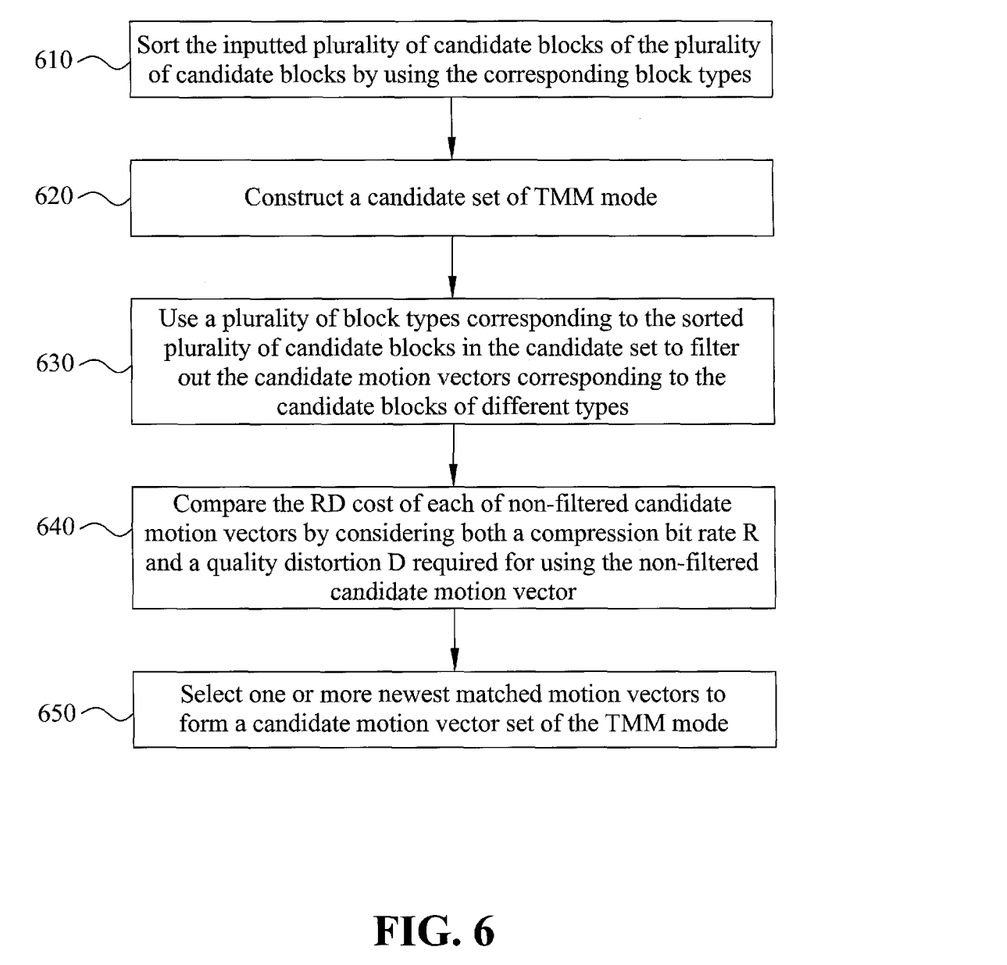
FIG. 6 shows an operation flow of constructing a type-based motion merge mode when a computing device performs an inter-prediction process, in accordance with an exemplary embodiment.

According to the embodiments, when the computing device 420 performs the inter-prediction process, the computing device sorts the plurality of coding blocks by using the classification result of the plurality of coding blocks outputted by the classifier 410 and filters one or more candidate blocks of different types. FIG. 6 shows an operation flow of constructing a type-based motion merge mode when the computing device 420 performs an inter-prediction process, in accordance with an exemplary embodiment. Referring to FIG. 6, when executing the inter-prediction process, the computing device 420 sorts the inputted plurality of candidate blocks by using the corresponding block types of the plurality of candidate blocks (step 610); constructs a candidate set of a TMM mode (step 620), wherein the candidate set is a set formed by a plurality of candidate motion vectors corresponding to the sorted plurality of candidate blocks; uses a plurality of block types corresponding to the sorted plurality of candidate blocks in the candidate set to filter out the candidate motion vectors corresponding to the candidate blocks of different types (step 630); compares the RD cost of each of non-filtered candidate motion vectors by considering both a compression bit rate R and a quality distortion D required for using the non-filtered candidate motion vector (step 640); and then selects one or more newest matched motion vectors to form a candidate motion vector set of the TMM mode (step 650).

Accordingly, because the candidate set is a set formed by the plurality of candidate motion vectors corresponding to the sorted plurality of candidate blocks, the coding accuracy may be improved. In addition, because the candidate blocks of different types are filtered out before comparison, this allows the TMM candidate motion vector set be an empty set so as to reduce the comparison computation and the memory data access.

Figure 7A:
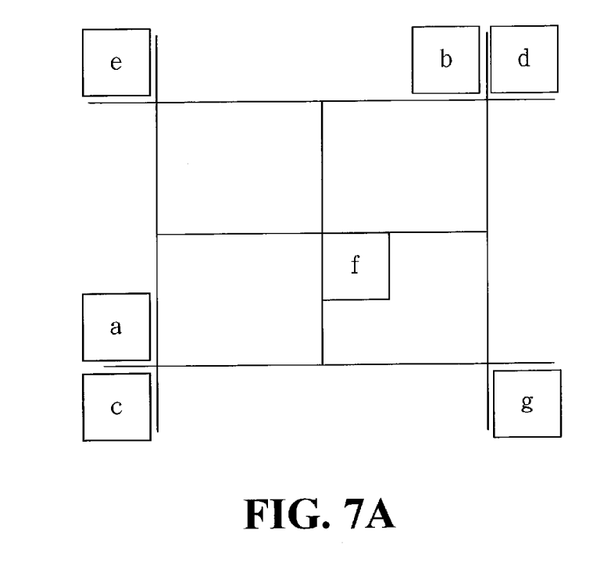
FIGS. 7A-7C show exemplary schematic views of a computing device constructing a motion vector candidate set of type-based motion merge mode, in accordance with an exemplary embodiment.
Figure 7B:
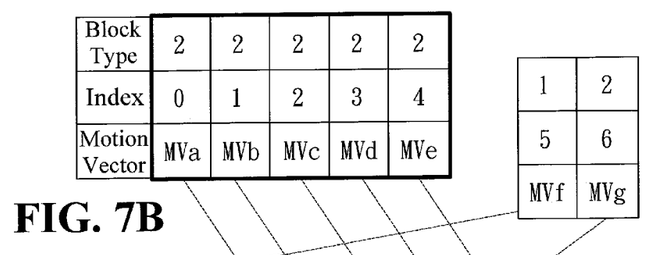
Figure 7C:
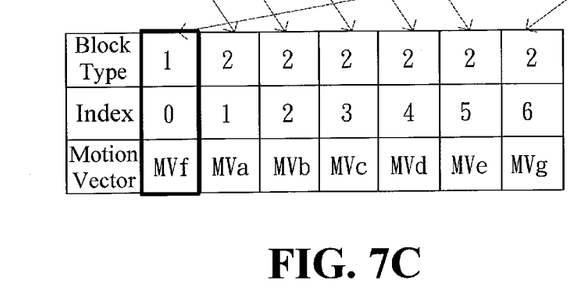

FIGS. 7A-7C show exemplary schematic views of a computing device constructing a motion vector candidate set of type-based motion merge mode, in accordance with an exemplary embodiment. In the exemplar of FIG. 7A, the different screens and the neighboring area of the same screen have seven candidate blocks corresponding to the locations, marked as candidate block a~candidate block g. Candidate block a~candidate block e are the five candidate blocks that are the candidate blocks corresponding to five locations of the neighboring area of the same screen, and candidate block f-candidate block g are the candidate blocks corresponding respectively to co-located locations in different screens. In the exemplar of FIG. 7B, the unsorted candidate blocks a~candidate block g correspond to two different block types (type 1 and type 2), with index 0~index 6 respectively, and corresponding to candidate motion vector MVa~MVg respectively. In the exemplar of FIG. 7C, the two block types (type 1 and type 2) corresponding to candidate blocks a~candidate block g are used to sort the candidate blocks. After sorting, the candidate block f with type 1 has the index 0 and corresponds to a candidate motion vector MVf; the candidate block a~candidate block e and candidate block g with type 2 have the index 1~index 6 respectively, and correspond to the candidate motion vectors MVa~MVe and MVg respectively. After sorting the seven candidate blocks (candidate block f, candidate block a~candidate block e, and candidate block g) according to block type, the corresponding candidate motion vectors (MVf, MVa~MVe, and MVg) are all included in the initial candidate set.

Accordingly, in step 630, at most k1 candidates may be selected from the initial candidate set as candidates, and k1 is less than the number of motion vectors in the initial candidate set. For example, in FIG. 7C, among the seven candidate vectors MVa~MVg, at most four candidates may be selected from MVa~MVe (such as, MVa~MVd), and at most one candidate may be selected from MVf~MVg (such as MVg). Then, the five selected candidate motion vectors form a TMM motion vector candidate set. The candidate motion vectors MVg and MVa~MVd are the first five motion vectors with the block type the same as that of the coding block.

Accordingly, after filtering out candidate motion vectors corresponding to candidate blocks with different block types, the step of selecting one or more best matched motion vectors may include: using each candidate motion vector V to compute a compression bit rate R(V) required for prediction coding and quality distortion D(V) obtained by the prediction coding, and to compare the cost of compression bit rate R and quality distortion D obtained by each of candidate motion vectors and select the motion vector with the least RD-cost. The correspondence of rate and distortion is that the more bits are used in coding, the better the compression quality may be obtained, but the cost of compression ratio may be reduced.

Figure 8:
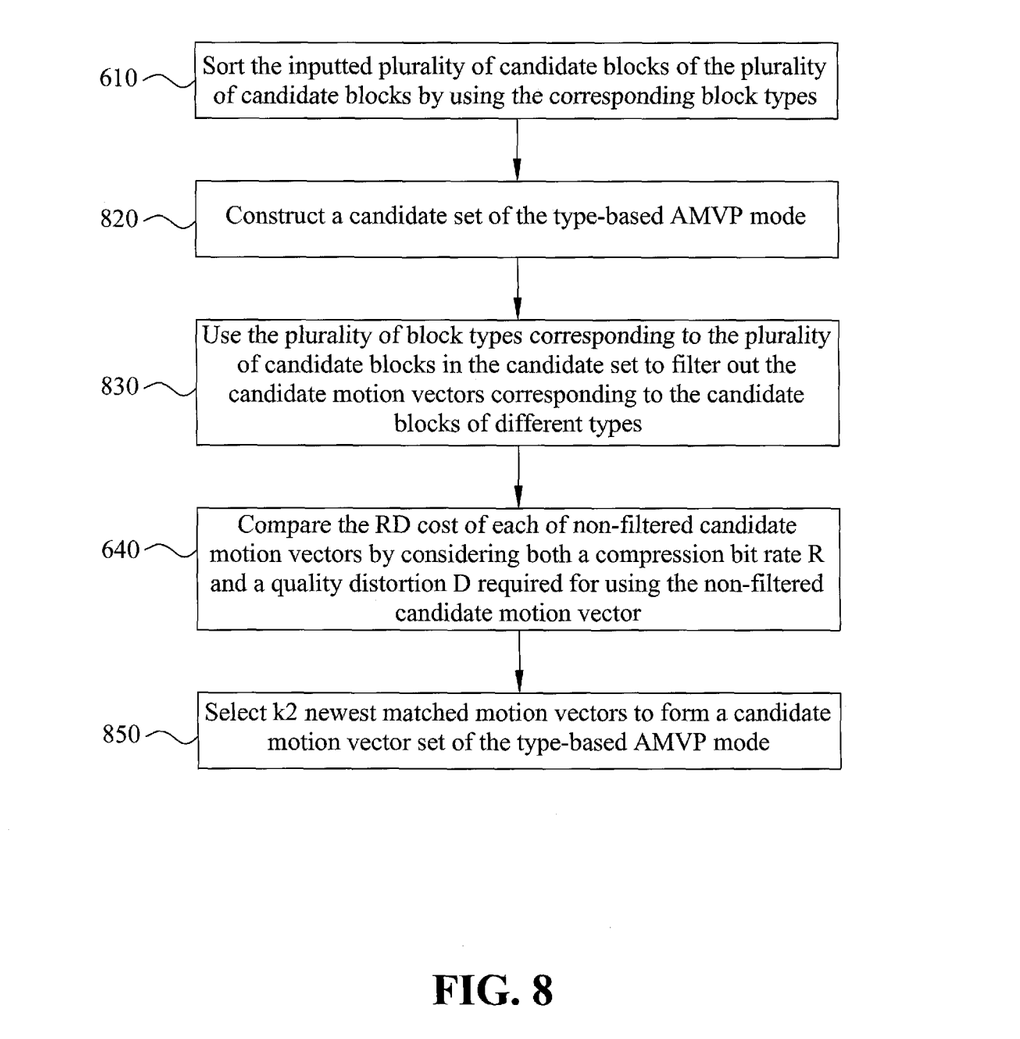
FIG. 8 shows an operation flow of constructing a type-based advanced motion vector prediction mode when a computing device performs an inter-prediction process, in accordance with an exemplary embodiment.

FIG. 8 shows an operation flow of constructing a type-based advanced motion vector prediction mode when a computing device performs an inter-prediction process, in accordance with an exemplary embodiment. As shown in the operation flow of FIG. 8, the first step is the same as step 610 of FIG. 6. The difference between step 820 and step 620 is to construct a candidate set of the type-based AMVP mode. The difference between step 830 and step 630 is that the candidate set of step 630 is from the candidate set of TMM mode in step 620, while the candidate set of step 830 is from the candidate set of typed-based AMVP mode in step 820. The difference between step 850 and step 650 is to select k2 newest matched motion vectors to form a candidate motion vector set of type-based AMVP, wherein k2 is less than the number of motion vectors in the candidate motion vector set of the type-based AMVP.

In other words, the difference between the TMM mode and the AMVP mode is in the number of candidates selected from the candidate set. For example, in TMM mode, five candidates are selected from a set of seven candidates, and one or more best candidate blocks are selected from the five candidates according to the RD-cost comparison result. In AMVP mode, at most two candidates are selected from a set of seven candidates, and then one or more best candidate blocks are selected from the five candidates according to the RD-cost comparison result. For example, in the exemplar of FIG. 7C, the AMVP mode selects only the first two motion vectors (MVf of block type 1 and MVa of block type 2) which have the same block type with the coding blocks as the motion vector candidate set of type-based AMVP mode, i.e., k2=2. Because the candidate set is a set formed by the plurality of candidate motion vectors corresponding to the sorted plurality of candidate blocks, the coding accuracy may be improved. Because candidate blocks of different block types are filtered out before comparison, the candidate motion vector of type-based AMVP mode is allowed to be an empty set. Thus, the type-based AMVP mode may improve the accuracy of search points to avoid falling within the wrong range of initial search points.

Figure 9:
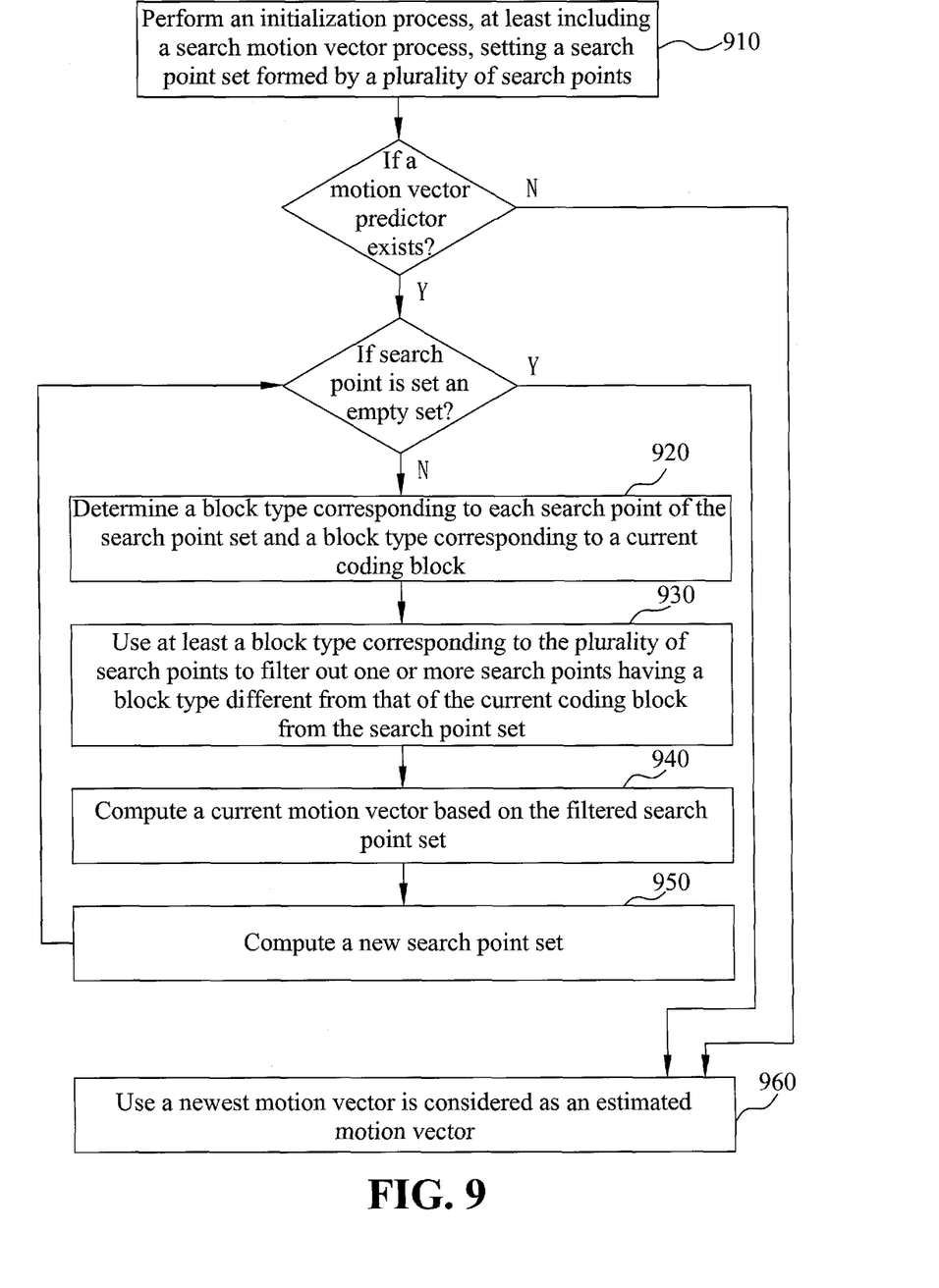
FIG. 9 shows an operation flow of a type-based motion vector estimation, in accordance with an exemplary embodiment.

According to the embodiments, the type-based motion vector estimation is designed as follows. In the motion vector estimation, the search point with a block type different from that of the coding block is filtered out to improve SCC effectiveness, such as, accelerating search speed, reducing memory data access bandwidth required for comparison and computing, avoiding searching for different block types, and using best matched to improve the accuracy of search motion vector estimation. As aforementioned, the computing device 420 may further performs the type-based motion vector estimation 240 based on the plurality of block types 414 and coded reference data 416. FIG. 9 shows an operation flow of the type-based motion vector estimation, in accordance with an exemplary embodiment.

Referring to FIG. 9, the computing device 420 may perform an initialization process. The initialization process at least includes a search motion vector process, setting a search point set S formed by a plurality of search points (step 910), wherein a search point is a prediction block required to be checked during the search motion vector process, and the motion vector of the prediction block corresponds to a location; in other words, the search point set is formed by a plurality of prediction blocks required to be checked. When a motion vector predictor exists, a block type corresponding to each of a plurality of search points of the search point set and a block type corresponding to a current coding block are determined (step 920), and at least a block type corresponding to the plurality of search points is used to filter out one or more search points having a block type different from that of the current coding block from the search point set (step 930). Then, based on the filtered search point set, a current motion vector is computed (step 940), and a new search point set is computed (step 950). Steps 920~940 are repeated until the motion vector predictor does not exist or the new search point set becomes an empty set, and then a newest motion vector is considered as an estimated motion vector (step 960).

In other words, when the computing device 420 performs the type-based motion vector estimation, the computing device 420 first determines whether a motion vector predictor (i.e., motion vector prediction seed) exists. When the motion vector predictor does not exist, the motion vector estimation is not performed. When the motion vector exists, the search points with block type different from that of the current coding block are filtered from the search point set to accelerate the search speed for a newest motion vector and reduce the memory data access bandwidth required for comparison and computation.

Accordingly, according to the exemplary embodiments, when the computing device 420 performs the inter-prediction process, the computing device 420 uses the block type of the coding blocks to filter out candidate motion vectors with block types different from that of the current coding block from both the candidate motion vector set of TMM mode and the candidate motion vector set of type-based AMVP mode to accelerate the speed of search and comparison. When the computing device 420 performs the motion vector estimation, the computing device 420 filters out the search point with block type different from that of the current coding block to accelerate the speed of search and comparison, as well as avoid searching towards different block type so as to rapidly obtain the best solution of the estimated motion vector during the search process for motion vector.

Figure 10A:
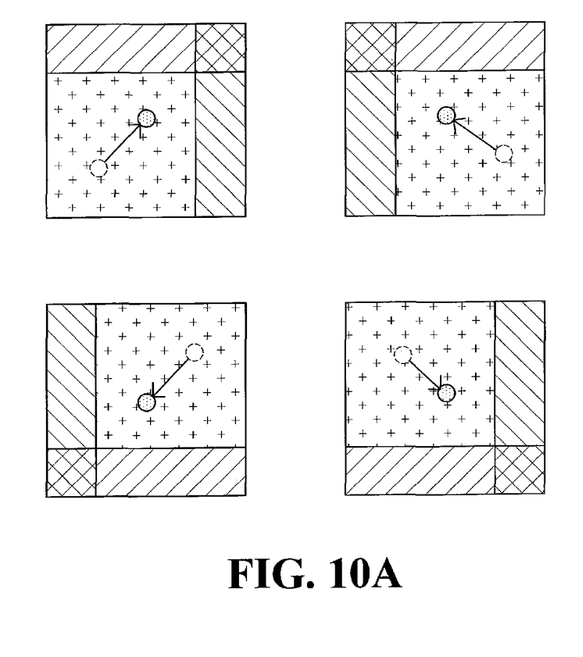
FIG. 10A shows exemplary schematic views of four boundary conditions of block types, in accordance with an exemplary embodiment.
Figure 10B:
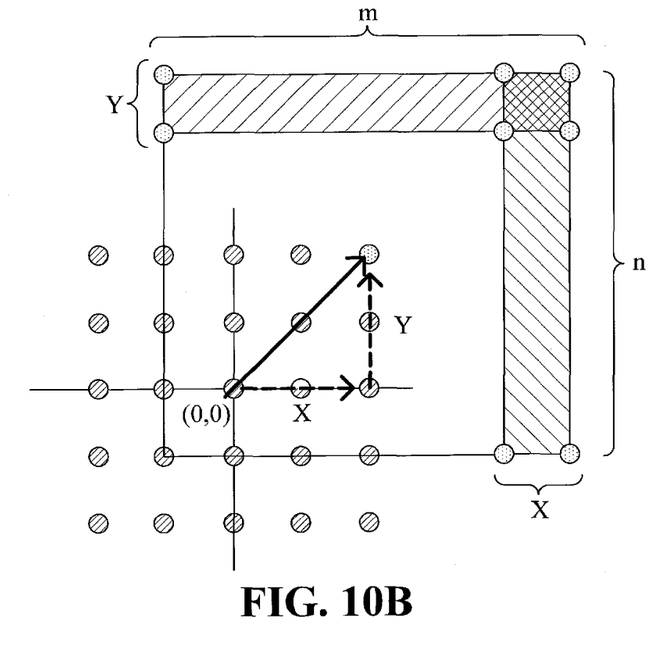
FIG. 10B shows an exemplary schematic view of processing boundary conditions of block types, in accordance with an exemplary embodiment.

In the search process of motion vector, when a block centered at location (0,0) moves to a location (x,y), one of the four boundary conditions of block types shown in FIG. 10A may be encountered. In other words, the motion vector (indicated by an arrow) of the block may search towards four directions, but not limited to, i.e. left-front, right-front, left-below, and right-below of the block. The dash line represents the search range, and is a boundary area crossing four different block types. Based on the embodiments, the block-type classifier for processing blocks with a cross-boundary block type is designed as follows. The classifier counts the count of each block type in the block and determines the block type with the maximum count as the block type of the block. FIG. 10B shows an exemplary schematic view of processing boundary conditions of block types, in accordance with an exemplary embodiment.

In the exemplar of FIG. 10B, m and n are the width and height of the block respectively, and x and y are the displacement in the x-direction and y-direction respectively when the block searches for motion vector(s). When a block moves to (x,y) from (0,0), the pixel count $T(x,y)$ of the same block type as the block may be computed by the formula: $T(x,y), (m-x)(n-y)+y\times(m-x)\times t(0,n)+x\times(n-y)\times t(m,0)+x\times y\times t(m,n)$, wherein when the block type corresponding to the block centered at (0,0) is the same as the block type corresponding to the block centered at (q,p), then $t(q,p)=1$; otherwise, $t(q,p)=0$. After computing $T(x,y)$, when $T(x,y)$ is greater than a threshold T1, the block may be viewed as having the same block type as that of the coding block and comparison is performed. When $T(x,y)$ is less than T1, the block is viewed as having a block type different from that of the coding block and the block is ignored.

Accordingly, the SCC efficiency provided by block classification in the exemplary embodiments is applicable, but not limited to, a sharing service platform of interactive screen contents, a multimedia communication system, a communication standard system, and so on. For example, the sharing service platform of interactive screen contents may share the screen executed by server to users through Internet so that the users may operate the server through an interactive interface.

In summary, according to the exemplary embodiment, it may use the difference between the screen video contents and common video contents to classify the coding blocks into a plurality of block types (such as, text image and natural image), and use the block types of the coding block to improve the inter-prediction/intra-prediction efficiency. The inter-prediction process includes using the block type of a coding block to filter at least a candidate block from the plurality of coding blocks, wherein each of the at least a candidate block has a block type different from that of the current coding block, and to compute a first candidate motion vector set of a type-based motion merge (TMM) mode, and a second candidate motion vector set of a type-based advanced motion vector prediction (AMVP) mode. According to the exemplary embodiments, it may further filter, based on the block type of the current coding block, the search points with block type different from that of the current coding block to rapidly find an estimated motion vector.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method of coding prediction for screen video, comprising:
   using a classifier to classify a plurality of coding blocks of a screen video contents into a plurality of block types; and
   based on the plurality of block types corresponding to the plurality of coding blocks, using a computing device to filter at least one of a plurality of candidate blocks from the plurality of coding blocks, to compute a first candidate motion vector set of a type-based motion merge (TMM) mode, and to compute a second candidate motion vector set of a type-based advanced motion vector prediction (AMVP) mode simultaneously with computing the first candidate motion vector set,
   wherein each of the at least one of the plurality of candidate blocks has a block type different from that of a current coding block,
   wherein computing the first candidate motion vector set of the TMM mode including:
   sorting the plurality of candidate blocks by using the plurality of block types comprising a text image and a natural image;
   constructing a candidate set of TMM mode; and
   using the plurality of block types corresponding to the plurality of candidate blocks in the candidate set to filter out at least one candidate motion vector corresponding to the at least one of the plurality of candidate blocks, then selecting one or more best matched motion vectors to form the first candidate motion vector set.

2. The method as claimed in claim 1, wherein the screen video contents include a non-natural image contents and a natural image contents, or one of the above two image contents.

3. The method as claimed in claim 2, wherein the non-natural image contents are one or more combinations of text, line, and graphics.

4. The method as claimed in claim 1, wherein classifying the plurality of coding blocks into the plurality of block types further includes:
when a count of at least one base color of each of the plurality of coding blocks is greater than or equal to a color count threshold, classifying the coding block as a block of a natural image contents; and
when the count of the at least one base color of each of the coding blocks is less than a color count threshold, using a frequency information of the coding block and a plurality of frequency count thresholds to determine the plurality of block types.

5. The method as claimed in claim 1, wherein the method further uses the computing device to include the plurality of candidate blocks corresponding to a plurality of locations in a plurality of neighboring areas in a same screen or a plurality of different screens into the candidate set of the TMM mode.

6. The method as claimed in claim 1, wherein computing the second candidate motion vector set of the type-based AMVP mode further includes:
sorting the plurality of candidate blocks by using the plurality of block types; constructing a candidate set of the type-based AMVP mode; and
using the plurality of block types corresponding to the plurality of candidate blocks in the candidate set to filter out at least one candidate motion vector corresponding to the at least one of the plurality of candidate blocks, then selecting one or more best matched motion vectors to form the second candidate motion vector set.

7. The method as claimed in claim 6, wherein the method further uses the computing device to include the plurality of candidate blocks corresponding to a plurality of locations in a plurality of neighboring areas in a same screen or a plurality of different screens into the candidate set of the type-based AMVP mode.

8. The method as claimed in claim 1, wherein the method further uses the computing device to perform a type-based motion vector estimation, including filtering out at least one search point from a search point set, thereby finding an estimated motion vector,
wherein each of the at least one search point has a block type different from that of the current coding block.

9. The method as claimed in claim 1, wherein the method further use the computing device to perform:
when a block being a boundary block, computing a count of the plurality of block types included in the block and determining a block type with a maximum count as the block type corresponding to the block.

10. A system of coding prediction for screen video, comprising:
a classifier that classifies a plurality of coding blocks of a screen video contents into a plurality of block types; and
a computing device that performs an inter-prediction process, based on the plurality of block types corresponding to the plurality of coding blocks, and the inter-prediction process including filtering at least one of a plurality of candidate blocks from the plurality of coding block, computing a first candidate motion vector set of a type-based motion merge (TMM) mode simultaneously with computing the first candidate motion vector set, and computing a second candidate motion vector set of a type-based advanced motion vector prediction (AMVP) mode,
wherein each of the at least one candidate block has a block type different from that of the current coding block,
wherein the computing device sorts the plurality of candidate blocks by using the plurality of block types comprising a text image and a natural image, and uses the plurality of block types corresponding to the plurality of candidate blocks in each of the first candidate motion vector set and the second candidate motion vector set to filter out at least one candidate motion vector corresponding to the at least one of the plurality of candidate blocks.

11. The system as claimed in claim 10, wherein the classifier uses a count and a frequency information of at least one base color in each of the plurality of coding blocks, a color count threshold and a plurality of frequency count thresholds to select the plurality of block types.

12. The system as claimed in claim 10, wherein the computing device further performs, based on at least one coded reference data, the inter-prediction process, and the coded reference data is one or more combinations of a plurality of pixels of the at least one coded reference block, at least one motion vector of the at least one coded reference block, and at least one type of the at least one coded reference block.

13. The system as claimed in claim 10, wherein the screen video contents include a non-natural image contents and a natural image contents, or one of the above two image contents.

14. The system as claimed in claim 10, wherein the computing device further filters out at least one search point from a search point set, thereby finding an estimated motion vector, wherein each of the at least one search point has a block type different from that of the current coding block.

15. The system as claimed in claim 10, wherein when a block is a boundary block, the computing device computes a count of the plurality of block types included in the block and determines a block type with a maximum count as the block type corresponding to the block.

16. The system as claimed in claim 10, wherein the computing device includes a plurality of candidate blocks corresponding to a plurality of locations in a plurality of neighboring areas in the same screen or a plurality of different screens into the candidate set of the TMM mode, and selects one or more newest matched motion vectors from a plurality of motion vectors corresponding to the plurality of candidate blocks in the candidate set to form the first candidate motion vector set.

17. The system as claimed in claim 10, wherein the computing device includes a plurality of candidate blocks corresponding to a plurality of locations in a plurality of neighboring areas in a same screen or a plurality of different screens into the candidate set of the AMVP mode, and selects one or more newest matched motion vectors from a plurality of motion vectors corresponding to the plurality of candidate blocks in the candidate set to form the second candidate motion vector set.

* * * * *